Oct. 4, 1938.   H. A. SATTERLEE   2,131,759
CONTROL SYSTEM
Filed Oct. 21, 1937
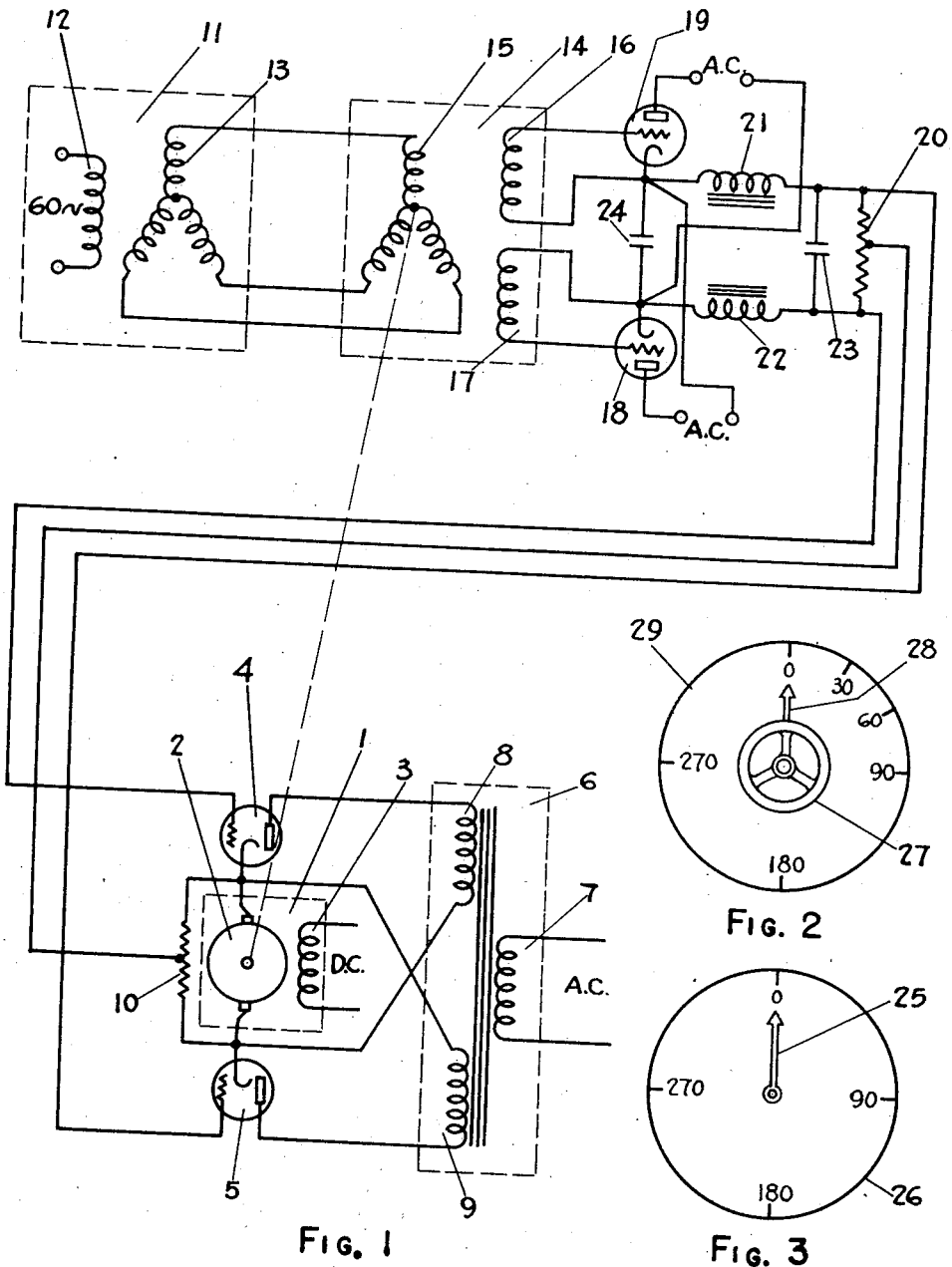
INVENTOR.
HOWARD A. SATTERLEE
BY
ATTORNEY.

Patented Oct. 4, 1938

2,131,759

UNITED STATES PATENT OFFICE 2,131,759

CONTROL SYSTEM

Howard A. Satterlee, Needham, Mass., assignor to Submarine Signal Company, Boston, Mass., a corporation of Maine Application October 21, 1937, Serial No. 170,203

5 Claims. (Cl. 172—239)

The present invention relates to a system for controlling the position of a body from a remote point.

According to the present invention the object which is to be rotated is driven by an electric motor through a grid-controlled rectifier circuit whereby the speed and direction of rotation of the motor can be controlled. The rectifiers which drive the motor are controlled by means of variable direct current potentials which are obtained from a special circuit in response to a simple manual adjustment performed at the operating station.

A schematic wiring diagram of the system is shown in Fig. 1 of the drawing, while Figs. 2 and 3 show schematically the control wheel at the operating station and a driven pointer at the remote station.

The object to be positioned, which may be the pointer 25 moving over the scale 26 in Fig. 3, is driven by the motor 1, which is preferably of the direct current type, having an armature 2 and a separately excited field 3. Current for operating the motor is obtained from the grid-controlled rectifiers 4 and 5 which are preferably of the gaseous discharge type, one tube being used for each direction of rotation. The anode circuits of these tubes are excited by alternating current through the transformer 6 having a primary winding 7 and secondary windings 8 and 9. The secondary winding 8 is connected across the anode and cathode of tube 4 in series with the armature 2 while the secondary winding 9 is connected across the anode and cathode of tube 5, also in series with the armature 2, but in the reverse direction. Shunting the armature and connecting the two cathodes is a resistance 10 which assists in providing potential for the control grids of the two tubes, as will be explained later.

At the operating station there is provided a self-synchronous motor 11 having a single-phase stationary winding 12 excited by alternating current and a three-phase winding 13 rotatable by the operator into a position corresponding to the desired position of the body at the remote point, e. g. by means of the handwheel 27 whose position is indicated by the pointer 28 and the scale 29 in Fig. 2. The three-phase winding of the motor 11 is connected to a similar three-phase winding 15 of a self-synchronous motor 14 conveniently located near the motor 1. The rotor 15 is also mechanically connected to the armature of the motor 1 or to the body which is to be positioned, suitable gearing being provided to give the proper rotation ratios.

The secondary windings of the self-synchronous motor 14 is made in two parts 16 and 17 arranged so that equal voltages will be induced in each, but which will simultaneously vary in opposite senses and in opposite directions for each side of normal rotor position at which both voltages are zero. These voltages are impressed across the grids and cathodes of two high vacuum grid-controlled rectifiers 18 and 19, respectively. Instead of dividing the secondary winding of motor 14 into two parts, a single winding may be employed connected to the primary of a transformer having its secondary in two parts which will then take the place of the windings 16 and 17.

The plate circuits of the rectifier tubes 18 and 19 are excited by alternating current from separate sources, each connected in series with the resistance 20 which forms the input resistance to the grids of the rectifiers 4 and 5. It will be noted that the connection of the output circuits of the tubes 18 and 19 to the resistance 20 is in reversed relationship. A filter circuit comprising the series chokes 21 and 22 and the shunt condensers 23 and 24 are interposed between the resistance 20 and the anode circuits of the tubes 18 and 19.

It will now be evident that when the two rotors 13 and 15 are in certain normal positions relative to each other and relative to their respective stator windings, no voltages will be produced in the secondaries 16 and 17; but if the position of rotor 13 be varied from that of rotor 15, equal voltages will be induced in the secondaries 16 and 17, resulting in making the grid of tube 19 opposite in polarity to the grid of tube 18. Let us assume that the change is such as to make the grid of tube 19 positive during the half cycles in which the anodes of both tubes are positive. The grid of tube 18 will then be negative and less plate current will flow through this tube. Plate current flowing through the tube 19 will cause a potential to be impressed across the resistance 20. The magnitude of the potential impressed on the grid of tube 19 will vary with the degree of difference in the positions of rotors 13 and 15; consequently the voltage impressed across resistance 20 will also vary.

Resistance 20 has its ends connected to the grids of rectifiers 4 and 5, respectively, while a center tap is connected to the central point of resistance 10. Thus the grid-cathode potential of the tube 4 is dependent upon the algebraic sum of the potential across the lower half of resistance 20 and the upper half of resistance 10, while grid-cathode potential of the tube 5 is equal to the algebraic sum of the potential across the upper half of resistance 20 and the lower half of resistance 10.

When the motor is at rest and the rotation of rotor 13 has been such as to make the grid of tube 18 positive so that current passes through this tube, the lower terminal of resistance 20 will be positive with respect to its upper terminal and the center point. The potential across the lower half of this resistance will form the grid potential of the tube 4 with respect to its cathode since at this time there is no other potential impressed across the resistance 10. The tube 4 will consequently become conductive and permit current to pass through the armature 2. At the same time, since the upper terminal of resistance 20 is negative with respect to the center point, the grid of tube 5 will be negative so that no current can pass through this tube.

The current passed through the motor armature by the tube 4 will cause the motor to revolve. As it gains speed, a back E. M. F. will be generated in the motor armature which will be impressed across resistance 10. The potential drop across the upper half of resistance 10 will be opposed to the potential across the lower half of resistance 20, and when the motor has attained a sufficient speed, the former may exceed the potential across the lower half of resistance 20 so that the grid of tube 4 becomes negative. This condition will exist for a sufficient number of cycles to permit the motor speed to be reduced to the point where the grid of tube 4 can again become positive. Since, however, rotation of the motor 2 brings about rotation of the rotor 15, the latter will eventually be brought into position corresponding to that of rotor 13 with respect to the respective stator windings of the devices 11 and 14 at which time the voltage induced across secondary 16 will become zero and consequently the grid potential of tube 4 in so far as it is supplied by the resistance 20 will likewise become zero so that no further current will flow through this tube. Any tendency of the motor 1 to continue to rotate will be resisted by tube 5 whose grid is no longer made negative by the drop across resistance 20 but has its potential determined by the potential across the lower half of resistance 10. This, being due to the back E. M. F. of the motor 1, will be in such a direction as to make the grid of tube 5 positive, thereby causing one or more half cycles of current to flow through the armature 2 in the reverse direction and supply a braking torque to the motor. This reverse current will, of couse, cease as soon as the motor comes to rest, for the back E. M. F. then becomes zero.

Nevertheless, any slight movement of the rotor 15 beyond the position of correspondence with rotor 13 will cause the potentials 16 and 17 to reverse so that the tube 18 becomes conductive and produces across resistance 20, a potential which will tend to make the grid of tube 5 positive, thereby bringing about an actual reversal of the motor 1. In practice, however, this condition seldom, if ever, occurs. However, if the operator displaces the rotor 13 in the reverse direction, a similar effect will occur causing the tube 5 to become conductive and rotate the motor in a reverse direction until the rotor 15 is again brought back into correspondence with the rotor 13. This system can be made to be very rigid and practically to give the effect of mechanical coupling betwen the rotor 13 and the body being positioned. To avoid elasticity in the system it is particularly desirable to make the voltages induced in the secondaries 16 and 17 large compared to the grid potentials required to produce maximum plate currents in the tubes 18 and 19.

Having now described my invention, I claim:

1. A remote-controlled positioning system including an electric motor for driving the object being positioned, two grid-controlled rectifiers of the gaseous discharge type for supplying motor operating current in opposite directions, respectively, and means for supplying direct current potentials to the rectifier grids in accordance with desired position changes comprising a self-synchronous motor having a single phase stator winding energized by alternating current and three-phase rotor winding adapted to be rotated by the operator into a position corresponding to the desired position of the object, a second self-synchronous motor having a three-phase rotor winding electrically connected in parallel with that of the first and mechanically connected to said driving motor, and a stationary winding composed of two sections disposed with reference to its rotor so as to have equal voltages induced in both sections, a pair of high vacuum grid-controlled rectifiers having their grids connected, respectively, each to one of said sections but in opposite polarity, a resistor having its ends connected to one of the grids of said gaseous rectifier and means for applying the output potentials of said high vacuum rectifiers across said resistor in opposite polarity.

2. A remote-controlled positioning system including an electric motor for driving the object being positioned, two grid-controlled rectifiers of the gaseous discharge type for supplying motor operating current in opposite directions respectively, means for supplying the anodes of said rectifiers with alternating potentials of opposite phase, and means for supplying direct current potentials to the rectifier grids in accordance with desired position changes comprising means adapted to be controlled by the operator for producing two equal alternating potentials in opposite phase and simultaneously variable in magnitude substantially in accordance with the degree of desired position changes and reversible in phase for opposite directions of position change, a pair of grid-controlled high vacuum rectifiers, means for applying said potentials to the respective grids of said second rectifiers, a resistor having its ends respectively connected to the grids of said gaseous rectifiers, a second resistor connected in shunt with the motor armature and by its ends to the cathodes of said gaseous rectifiers, both of said resistors having their electrical centers connected together, means for applying the output potentials of both high vacuum rectifiers across said first-mentioned resistor, and means operated by said motor for reducing said gaseous rectifier grid potentials to zero as the desired position of the object is attained.

3. A remote-controlled positioning system including an electric motor for driving the object being positioned, a transformer having a single phase stationary winding supplied with alternating current and a polyphase rotatable winding whose position is controllable by the operator in accordance with desired position changes, a second transformer having a rotatable polyphase winding electrically connected to the polyphase winding of the first transformer and mechanically connected to said motor and single phase stationary windings adapted to produce two normally equal potentials varying in relative magnitude in response to relative displacements between said two rotatable windings as referred to their respective stationary windings, a pair of high vacuum grid-controlled rectifiers, the said grids being respectively energized by the potentials of the stationary windings of said second transformer and said rectifiers being adjusted to produce maximum output current at small values of grid potential, a center-tapped resistor connected across the outputs of both rectifiers through a smoothing filter, a pair of gaseous grid-controlled rectifiers for driving said motor, one for each direction of rotation and means for applying the potentials across the two halves of said resistor to the grids of said gaseous rectifiers respectively.

4. A remote-controlled positioning system including an electric motor for driving the object to be positioned, a pair of grid-controlled rectifiers for operating said motor, one for each direction of rotation, said rectifiers being arranged to pass current impulses through the motor during those half cycles of anode potential in which their respective anodes are positive and their respective grids are also positive, the said grid potentials being the resultant of an applied uni-directional potential and a potential varying with the motor speed, said applied potential being derived from two sources having normally equal magnitudes which are simultaneously variable by the operator in opposite senses and in both directions, means for opposing said potentials and applying the resultant potential to the grids of said rectifiers in opposite polarity and means for algebraically adding the said potential which varies with motor speed to said applied potentials in such a manner as to oppose applied positive grid potential of one rectifier for one direction of motion and to oppose applied positive grid potential of the other rectifier for the opposite direction of motion.

5. A remote-controlled positioning system including an electric motor for driving the object to be positioned, a pair of grid-controlled rectifiers for operating said motor, one for each direction of rotation, said rectifiers being arranged to pass current impulses through the motor during those half cycles of anode potential in which their respective anodes are positive and their respective grids are also positive, the said grid potentials being the resultant of an applied uni-directional potential and the motor back E. M. F., said applied potential being derived from two sources having normally equal magnitudes which are simultaneously variable by the operator in opposite senses and in both directions, means for opposing said potentials and applying the resultant potential to the grids of said rectifiers in opposite polarity and means for algebraically adding the said motor back E. M. F. to said applied potentials in such a manner as to oppose applied positive grid potential of one rectifier for one direction of motion and to oppose applied positive grid potential of the other rectifier for the opposite direction of motion.

HOWARD A. SATTERLEE.